(12) United States Patent
Ramaswamy

(10) Patent No.: US 9,975,483 B1
(45) Date of Patent: May 22, 2018

(54) DRIVER ASSIST USING SMART MOBILE DEVICES

(71) Applicant: Amazon Technologies, Inc., Reno, NV (US)

(72) Inventor: Sharadh Ramaswamy, Sunnyvale, CA (US)

(73) Assignee: Amazon Technologies, Inc., Reno, NV (US)

(*) Notice: Subject to any disclaimer, the term of this patent is extended or adjusted under 35 U.S.C. 154(b) by 848 days.

(21) Appl. No.: 13/763,330

(22) Filed: Feb. 8, 2013

(51) Int. Cl.
  *B60Q 1/00* (2006.01)
  *B60Q 11/00* (2006.01)
  *G06F 3/01* (2006.01)

(52) U.S. Cl.
  CPC ............. *B60Q 11/00* (2013.01); *G06F 3/013* (2013.01)

(58) Field of Classification Search
  CPC ...... G08B 21/0476; B60Q 11/00; G06F 3/013
  USPC ........................................................ 340/435
  See application file for complete search history.

(56) References Cited

U.S. PATENT DOCUMENTS

| | | | | |
|---|---|---|---|---|
| 7,365,769 B1* | 4/2008 | Mager | ...................... | B60Q 1/44 340/467 |
| 8,576,286 B1* | 11/2013 | Childs | ................... | G01C 21/00 348/113 |
| 2004/0178890 A1* | 9/2004 | Williams | ................. | B60Q 1/52 340/425.5 |
| 2006/0214807 A1* | 9/2006 | Tengshe | ................. | G08B 21/06 340/576 |
| 2006/0271286 A1* | 11/2006 | Rosenberg | ......... | G01C 21/3647 701/431 |
| 2007/0219695 A1* | 9/2007 | Chiu | ...................... | B60W 30/08 701/51 |
| 2009/0192686 A1* | 7/2009 | Niehsen | ................ | B60W 30/17 701/70 |
| 2009/0243880 A1* | 10/2009 | Kiuchi | .................. | G01L 311/26 340/903 |
| 2010/0211307 A1* | 8/2010 | Geelen | ................. | G01C 21/265 701/533 |
| 2011/0169625 A1* | 7/2011 | James | .................... | B60Q 9/008 340/439 |
| 2012/0161931 A1* | 6/2012 | Karmakar | ............. | G01S 13/753 340/10.1 |

(Continued)

FOREIGN PATENT DOCUMENTS

JP         2009205642 A  *  9/2009
WO    WO 2012150591 A2  *  11/2012    ............. H04N 7/185

*Primary Examiner* — Zhen Y Wu
(74) *Attorney, Agent, or Firm* — Polsinelli LLP

(57) ABSTRACT

Approaches are described for utilizing a combination of location determining and tracking techniques to attempt to provide driver assistance under a variety of different circumstances, such as location assistance to locate or get back to a particular object or location, and visual and/or audible assistance to alert a driver of potential danger. For example, a driver assistance system can be provided that can monitor traffic conditions as well as attentiveness of a driver using a portable computing device (such as a mobile phone) to provide visual and/or audible notifications to alert the driver to potential dangers and/or take defensive action. The driver assistance system can further be used to automatically determine the location of a user's parked automobile and provide assistance, such as directions, to get back to the location where the user parked his or her automobile.

24 Claims, 11 Drawing Sheets

(56) References Cited

U.S. PATENT DOCUMENTS

| | | | | |
|---|---|---|---|---|
| 2012/0235805 A1* | 9/2012 | Nogami | ............... | G06T 7/215 340/441 |
| 2013/0024075 A1* | 1/2013 | Zagorski | ............ | B60W 30/095 701/46 |
| 2013/0024202 A1* | 1/2013 | Harris | .................. | G06Q 30/00 705/1.1 |
| 2013/0030651 A1* | 1/2013 | Moshchuk | ............ | G08G 1/166 701/41 |
| 2013/0210406 A1* | 8/2013 | Vidal | .................... | H04W 4/00 455/418 |
| 2014/0071286 A1* | 3/2014 | Bernal | ..................... | G06T 7/20 348/149 |
| 2014/0111647 A1* | 4/2014 | Atsmon | ................ | H04N 7/185 348/148 |
| 2014/0156183 A1* | 6/2014 | Windeler | .............. | G08G 1/144 701/454 |
| 2014/0210978 A1* | 7/2014 | Gunaratne | ........ | G06K 9/00604 348/77 |

* cited by examiner

DRIVER ASSIST USING SMART MOBILE DEVICES

BACKGROUND

As computing devices offer increasing processing capacity and functionality, users are able to operate these devices in an expanding variety of ways. For example, users can use their device, such as a smart phone, to receive driving directions. Further, users might want a way to remember where they parked their car. Since electronic devices such as smart phones increasingly include a global positioning system (GPS) or other coordinate-determining technology, the user can utilize an application to tag where the user left his or her car, and can utilize that application to locate the car at some future point in time. Such an approach is not optimal in all situations, however, as a user must manually tag the location of the car each time the user leaves the car, which can be frustrating or at least time consuming for the user.

BRIEF DESCRIPTION OF THE DRAWINGS

Various embodiments in accordance with the present disclosure will be described with reference to the drawings, in which.

DETAILED DESCRIPTION

Figure 1:
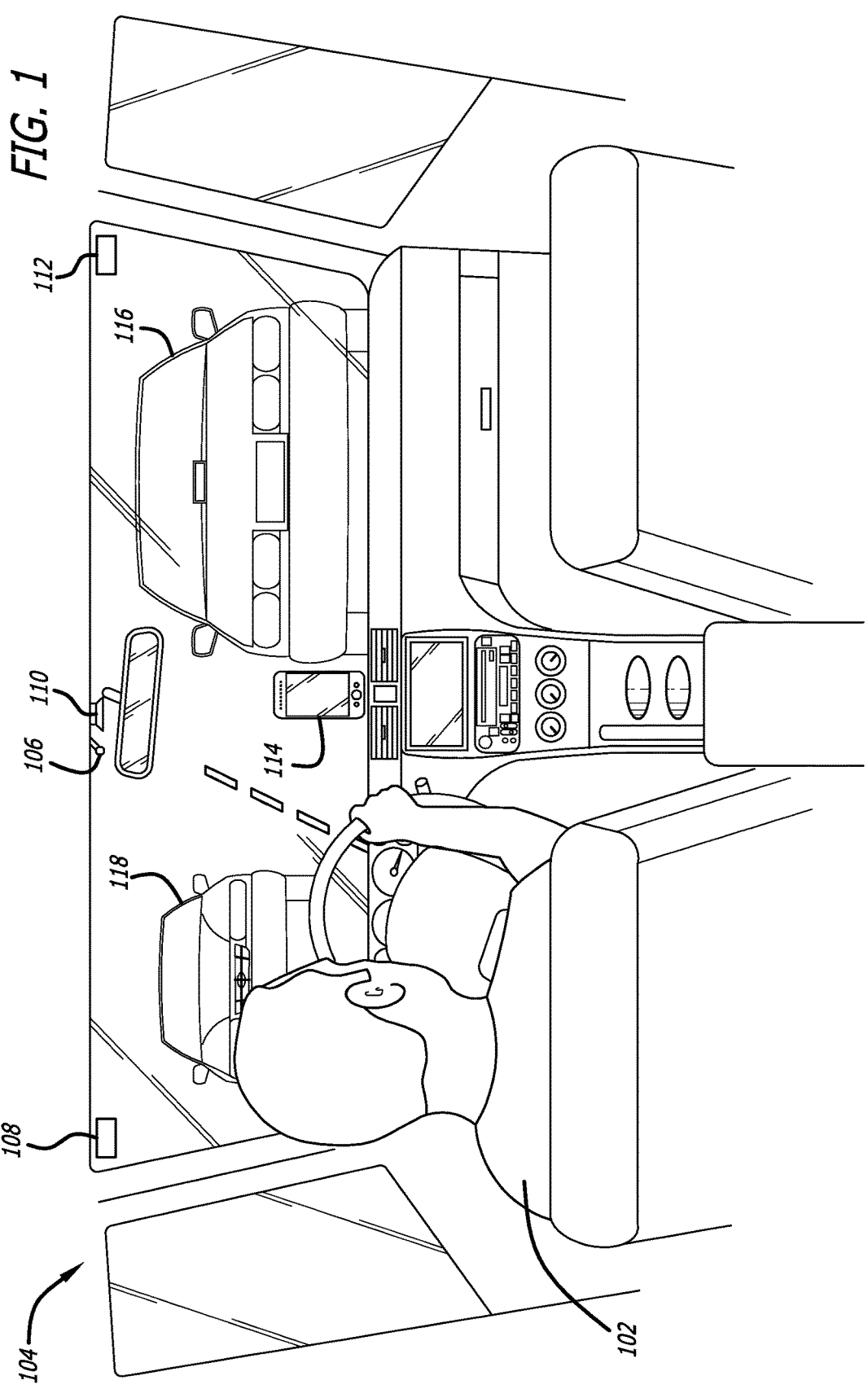
FIG. 1 illustrates an example environment in which aspects of the various embodiments can be implemented.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches to locating objects and providing assistance using an electronic device. In particular, various embodiments utilize a combination of location determining and tracking techniques to attempt to provide driver assistance under a variety of different circumstances, such as location assistance to locate or get back to a particular object or location, and visual, audible, and/or tactile assistance to alert a driver of an object or situation to which the user might want to pay attention, such as a potential danger.

For example, a driver assistance system can be provided that attempts to monitor traffic conditions as well as attentiveness of a driver using a portable computing device (such as a mobile phone) to provide visual and/or audible notifications to alert the driver to potential dangers and/or take defensive action. In this situation, the mobile phone can be placed in a location, such as on the automobile dashboard or windshield, in such a manner that a first camera (e.g., a rear facing camera) is able to obtain image information of at least a portion of the road and/or surroundings while a second camera (e.g., a front facing camera) is able to obtain image information of at least a portion of the inside the automobile, as may include a region near the driver's seat. Based at least in part on the image information obtained from the front facing camera, the computing device can utilize any or a combination of gaze tracking, blink (frequency) detection, head and body tracking, or other such user monitoring to determine a measure of the user's attentiveness or attention, as may be based at least in part upon head position and/or direction of gaze. Based at least in part on the image information obtained from at least one rear facing camera, for example, the computing device can monitor for pedestrians (e.g., pedestrians crossing the road), obstacles, other automobiles (e.g., automobiles stopped, slowing down, changing lanes, etc.), road work signs, speed limits as well as monitor the user's control of the car by estimating the car's speed and its position within the road. By monitoring the surroundings, the device can attempt to predict or identify potential hazards or situations of which the user should be aware. The device can provide notification upon detecting specific situations. By also monitoring inside the automobile, the device can determine whether or not the user is likely paying attention to, or aware of, the situation, and for at least some situations can provide a different alert or notification to the user of potential dangers and hazards, such that the user can take preventative or defensive action, etc.

In accordance with other embodiments, the driver assistance system can further determine how to locate or get back to a particular object or location, such as the location where the user parked his or her automobile. As described further herein, the location coordinates where the user parked his or her automobile can be determined in a number of ways, such as, e.g., by using one or more camera of the device and/or a global positioning system (GPS) or other coordinate-determining technology of the device.

When determining location coordinates using the camera of the device, the device can be placed in a location, such as on the automobile dashboard, in such a manner that a camera, such as a rear facing camera, is facing at least partially out of the automobile. The rear facing camera can obtain image data of at least one object, and the image data can be processed to determine whether the automobile is moving, accelerating, decelerating, or stopped. In response to detecting that the automobile has stopped (e.g., is parked) based at least on the image data, and without any manual interaction being required on the part of the user, the device can capture a snapshot of the GPS location of the device, or can otherwise utilize a location determination approach to determine the current location and/or coordinates. Thereafter, the determined location can be used to locate and/or provide directions to the user's automobile.

When determining location coordinates using a position-determining technology such as GPS technology, cellular triangulation technology, etc., the device can be used to determine a relatively accurate set of location coordinates which can be used to locate a parked/stopped automobile. For example, GPS signal data can be monitored to determine a rate of change of position of the device, and the rate of change of position can be used to determine the location of the user's stopped or parked automobile. In this instance, the device can use the rate of change of position to determine when the user is in an automobile and when the user is walking away from the automobile, and the location of the point of transition can be the location where the user parked. Thereafter, the GPS position indicated by the point of transition can be stored and used to locate and/or provide directions to the user's automobile.

Various other applications, processes, and uses are presented below with respect to the various embodiments.

As mentioned, users of electronic devices can benefit from a driver assistance system that can alert users to potential driving hazards and/or determine how to locate, or get back to a particular object or location, such as the location where a user parked his or her car. Given the large amount of traffic on the road, road safety is very important aspect of public health. However, few of the already existing automobiles have a driver assistance system in place. Further, although applications exist that enable users to indicate, to an electronic device, where the user parked the car, this conventionally involves the user launching an application after parking the car and selecting an option indicating that the device should remember the current location. This typically involves using GPS or cellular-based location or navigation data to determine coordinates (e.g., latitude and longitude) for the marked position and store those coordinates for subsequent retrieval. When a user wants to return to the car, the user typically launches the application again and selects an option indicating that the user would like information helping the user to locate the car. Such an approach can be relatively cumbersome for a user, as the user must perform these actions each time the user parks the car in order for the information to be available. In accordance with various embodiments, systems and methods utilize a combination of location determining and tracking techniques to attempt to provide location, visual and/or audible assistance under a variety of different circumstances.

FIG. 1 illustrates an example environment in which aspects of the various embodiments can be implemented. As described above, a portable driver assistance system can provide visual, audible, and/or tactile assistance to a user (such as a driver). For example, the portable driver assistance system can monitor environmental characteristics, such as traffic conditions, as well as user characteristics, such as attentiveness of a driver, using a portable computing device to provide visual, audible, and/or tactile assistance to alert a driver of an object or situation to which the user might want to pay attention, such as a potential danger.

As shown in FIG. 1, a portable computing device 114 is being used to monitor environmental characteristics, such as traffic conditions, as well as attentiveness of a user 102. Although a portable computing device (e.g., an electronic book reader, smart phone, or tablet computer) is shown, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, smart televisions, and portable media players, among others.

As further shown in FIG. 1, the user 102 (e.g., a driver of an automobile) is driving an automobile 104. Although an automobile is described herein, various other vehicles or moving objects can be used as well within the scope of the various embodiments, such as but not limited to boats, planes, bikes, hang gliders, autonomous vehicles/objects, snowmobiles, wearable objects that can have imbedded technology to implement the various teachings herein, such as glasses, goggles, helmets, among others. The automobile, in this example, includes one or more sensors such as a microphone 106 capable of receiving audio input, and one or more cameras 108, 110, 112 positioned around the automobile capable of obtaining image (or video) data of at least the sides, rear, and front of the automobile. It should be understood that reference numbers for similar objects may be carried over between figures for purposes of simplicity of understanding, but such use is merely for purposes of explanation and should not be interpreted as a limitation on the various embodiments unless otherwise stated.

The portable computing device 114, such as a mobile phone, is positioned on the dashboard of the automobile in such a manner that at least a first camera (e.g., one or more rear facing cameras) can obtain image data of at least a portion of the road and/or surroundings, while at least a second camera (e.g., one or more front facing cameras) can obtain image data of objects to the rear of the automobile, along with image data of at least a portion of the inside of the automobile, as may include a region near the driver's seat. The device can additionally be paired with the automobile to receive audio and/or image data from the microphone and cameras associated with the automobile. For example, a signal or other indication communicated through wired or short-range wireless technologies, such as Bluetooth, ultra-wide band (UWB), wireless Universal Serial Bus (USB), Near Field Communication (NFC) is received at the device, where the device can communicate with the automobile to determine that the device is within a detection range of the automobile. In response to determining the signal, the device can receive audio and image data obtained from at least the microphone and/or camera positioned around the automobile.

The front facing cameras can utilize any or a combination of gaze tracking, blink (frequency) detection, head and body tracking algorithms, or other such user monitoring to determine a measure of the user's attentiveness or attention, as may be based at least in part upon user orientation information such as head position, direction of gaze and/or any other user characteristic. The rear facing cameras can use one or more identifying algorithms, or other such approaches to monitor and check for pedestrians (e.g., pedestrians crossing the road), obstacles, activity of other automobiles 116, 118 (e.g., automobiles stopped, slowing down, changing lanes, etc.), road work signs, speed limits as well as monitor the user's control of the car by estimating the car's speed and its position within the road or any other environmental characteristic. Other algorithms can include, for example, image recognition algorithms, object identification algorithms, facial recognition algorithms, or any other such approaches or techniques used to determine potential driving hazards.

By monitoring the surroundings, the device can attempt to predict or identify potential hazards or situations of which the user should be aware. The device can provide notification upon detecting specific situations. By also monitoring inside the automobile, the device can determine whether or not the user is likely paying attention to, or aware of, the situation, and for at least some situations can provide a different alert or notification to the user of potential dangers and hazards, such that the user can take preventative or defensive action, etc. In some other embodiments, the device can control the automobile to take defensive action, such as by stopping the automobile if an unexpected object is detected in front of the automobile.

Figure 2A:
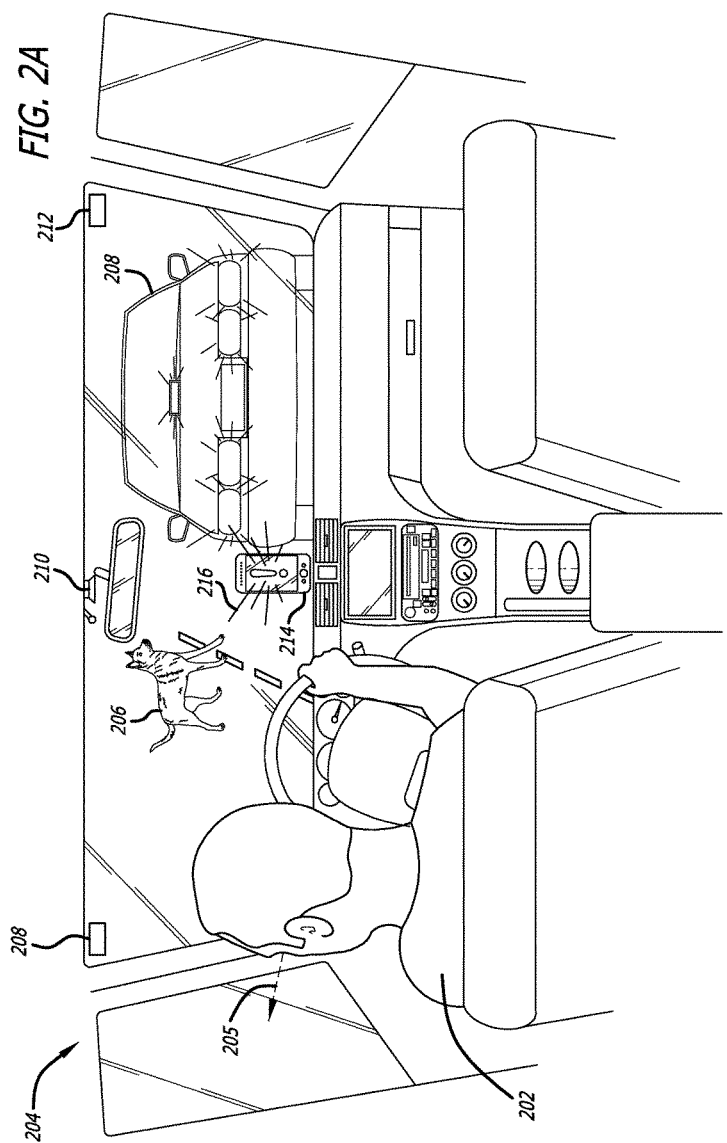
FIGS. 2A-2B illustrate an example a situation for providing visual and/or audible notifications to alert a driver to potential dangers, in accordance with an embodiment.

FIG. 2A illustrates a situation where the portable computing device 214 alerts the user to potential dangers and/or hazards of which the user should be aware. As shown in FIG. 2A, a user 202 (e.g., a driver of an automobile) is driving an automobile 204 and has averted 205 their attention from the road by, e.g., looking out the driver-side window. In other embodiments, the user may have averted their attention from the road by looking out the passenger-side window, to the floor of the automobile, out of the rear window, or otherwise in any direction that causes the user to avert their attention from the road. In any situation, the user does not notice that a dog 206 has walked onto the road within a threshold distance within the driving path of the automobile or that an automobile 208 in front of the user's automobile within a threshold distance of the automobile is suddenly slowing down (or has otherwise stopped). In accordance with an embodiment, the threshold distance can be any distance, such a predetermined distance (e.g., five feet), or a calculated time-to-arrival of the automobile to the object (e.g., two seconds), among others.

It should be noted that various other potential dangers, hazards, or characteristics of objects in the environment with respect to the automobile of which the user should be aware, can satisfy an alert criterion that can trigger an alert, wherein satisfying the alert criterion can include detecting at least one of a vehicle stopping within a threshold distance within a driving path of the automobile, a vehicle moving in a direction towards the automobile, flashing brake or warning lights of a vehicle located within a threshold distance within the driving path of the automobile, flashing a turn signal of a vehicle located within a threshold distance within the driving path of the automobile, a vehicle crossing or driving into within a threshold distance the driving path of the automobile, pedestrians crossing in front of the car, animals near within a threshold distance of the roadway, etc.

As described above, few of the already existing automobiles have a driver assistance system in place, and as such, a driver of those vehicles would not be alerted to these potential dangers. However, in accordance with various embodiments, a portable computing device can utilize a any or a combination of gaze tracking, blink (frequency) detection, head and body tracking, or other such user monitoring to determine a measure of the user's attentiveness or attention, as may be based at least in part upon head position and/or direction of gaze to provide visual, audible, and/or tactile assistance to alert a driver of an object or situation to which the user might want to pay attention, such as a potential danger. For example, using approaches in accordance with various embodiments, the attentiveness and attention of a driver can be determined based at least on the user's gaze direction. In accordance with an embodiment, images of the user's head, face, and/or eyes are obtained using the front facing camera of the device, cameras 208, 210, 212 of the automobile, or a combination thereof, and the obtained images can be used to determine the user's gaze direction.

In accordance with an embodiment, determining the user's gaze direction can include, for example, first determining that the user's head is within the field of view of at least one camera (e.g., a front facing camera) of the device. Using a single camera can enable the device to determine the relative direction of the user, and the size of the user's head in the captured image information can be used to estimate a distance to the user. In situations where there are at least two cameras, or a stereoscopic imager, operable to determine three-dimensional information, the relative position of the user's head to the device can be determined. The device can also analyze the image information in at least some embodiments to determine the relative position of the user's eyes with respect to the user's head. The eyes can be captured using ambient or infrared light, for example, in order to determine a size, shape, location, or other such aspect of the user's retina, cornea, iris, or other such aspect, which can be used to determine an approximate gaze direction of the user with respect to the device.

At substantially the same time as determining the user's gaze direction, traffic conditions can be determined based at least on determined objects in the road, and/or movement of those objects. For example, the computing device can use image data obtained from the rear facing camera of the device, the automobile's cameras, or a combination thereof, to determine the relative direction and/or location of one or more objects (such as dog 206 or automobile 208) with respect to the computing device. In this example, both objects are within the field of view of the camera, such that the device can determine the relative direction to each object. Again, if stereoscopic or other such information is available, the computing device can also determine the relative positions of those objects in three dimensions.

When the device has determined the gaze direction of the user, as well as the relative directions and/or locations of the nearby objects (such as dog 206 or automobile 208), the device can do a geometric analysis to determine the position of the objects relative to the user's gaze direction. Using simple vector addition, for example, if the device knows the relative position of the user, the relative position of the objects, and the gaze direction of the user, the device can determine whether the user's attention is directed towards the objects or away from the objects. If three-dimensional information is not available or a lower resolution is acceptable, the device can use two-dimensional direction information to make a similar determination. For example, in this case there is one object in front of the device (such as dog 206), and if the device can determine that the user is gazing to the left or other away from the object, that might be enough to indicate to the device that the user is likely not looking at the object in front of the device.

Upon determining the user's gaze direction, as well as a relative position of the user to the computing device, the computing device can correlate the gaze direction with objects (such as the dog 206 and automobile 208) in the field of view of the rear facing camera of the device to determine whether the user is gazing in a direction substantially outside the field of view of the rear facing camera, and thus, most likely does not see the objects. In this case, the computing device can alert 216 the user of the dog or automobile. For example, the computing device can sound an alarm or other audible alert. Additionally or alternatively, the computing device can perform a visual alert, such as by flashing a light or symbol, or tactile assistance, such as vibrating or causing some aspect of the automobile to vibrate. In other embodiments, the computing device can take defensive action, such as by controlling the automobile to steer around or otherwise stop the automobile before the potential danger.

In various other embodiments, the user's gaze direction may be within the field of view of the rear facing camera; however, the user may be nodding off or otherwise falling asleep, and may not be aware of the dog 206 or automobile 208. In accordance with various embodiments, the user's attentiveness, in this example, can be determined by monitoring the user's blinking frequency, and comparing the user's blinking frequency to a blinking frequency threshold. A blinking frequency below the blinking frequency threshold (e.g., less than five blinks per minute) can be indicative that the user is falling asleep, and thus, is most likely unaware of any potential danger, and is in danger of falling asleep. In this case, as described above, the computing device can sound an audible alert, perform a visual alert, and/or provide tactile assistance.

Figure 2B:
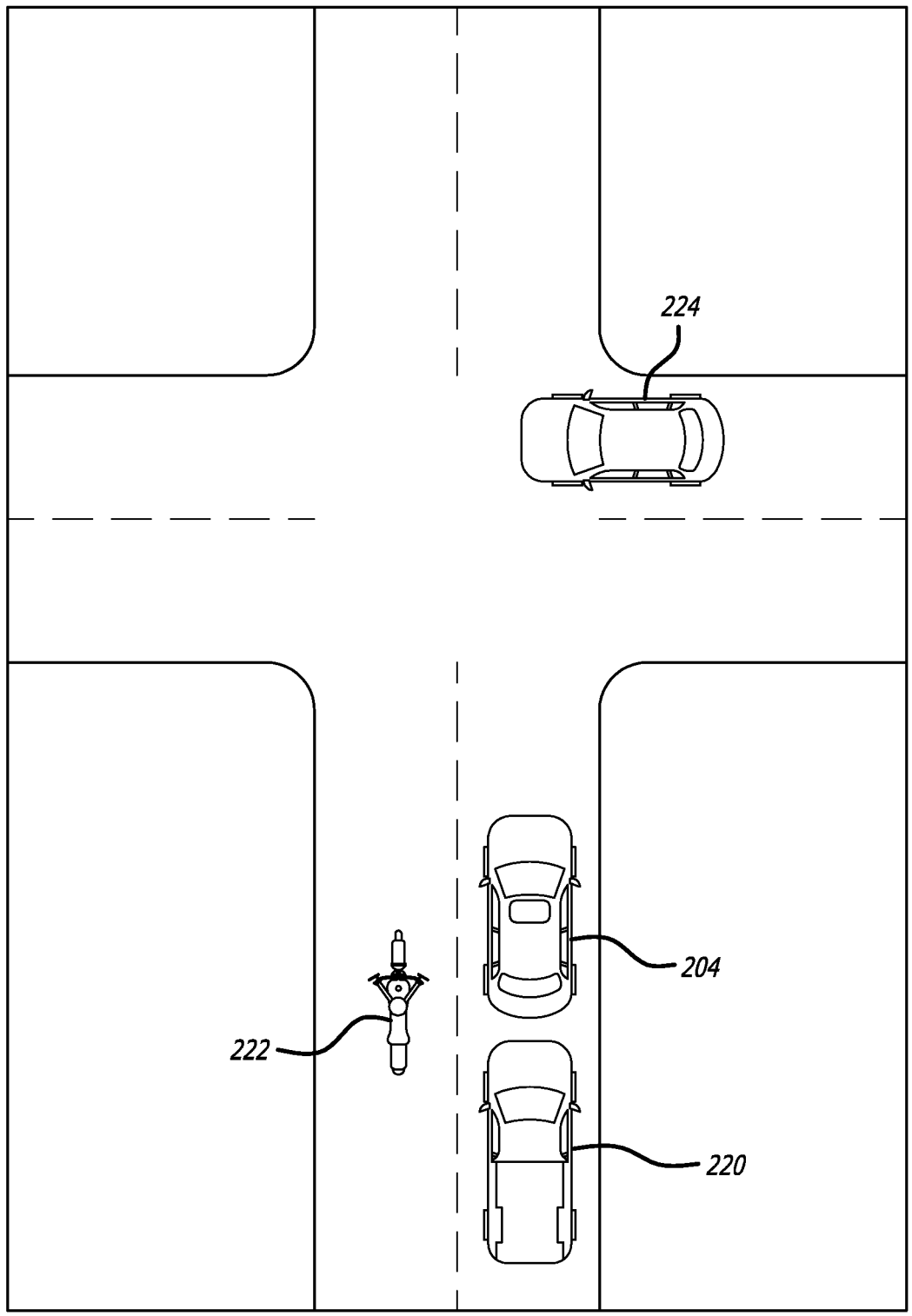

It should be noted that various other approaches can be used as well within the scope of the various embodiments to detect a potential hazard and/or dangerous driving situation. For example, FIG. 2B illustrates several additional potential hazards that can be detected by the user's portable computing device. As described above, a portable computing device, such as a mobile phone, can be positioned on the dashboard of the automobile 204 in such a manner that the cameras of the device and/or the automobile can be used to obtain image data of objects in front of the automobile, to the rear of the automobile, and/or inside the automobile. By monitoring the surroundings, the device can attempt to predict or identify potential hazards or situations of which the user should be aware. The device can provide notification upon detecting specific situations. By also monitoring inside the automobile, the device can determine whether or not the user is likely paying attention to, or aware of, the situation, and for at least some situations can provide a different alert or notification to the user of potential dangers and hazards, such that the user can take preventative or defensive action, etc. For example, as shown in FIG. 2B, the user can be alerted to automobile 224 situated within the intersection, automobile 220 to the rear of the user, and motorcyclist 222 in the user's driving blind spot.

Each of these motor vehicles can be a potential hazard and the computing device can alert the user to such situations regardless of the user's attentiveness, attention and/or gaze direction. For example, although the computing device may determine that the user's attention is on the road, the user may not be aware of a motorcyclist 222 in the user's blind spot. In this instance, the computing device can alert the user with a visual and/or audio notification indicating that a vehicle is in the user's blind spot. In various embodiments, it may be desirable to alert the user to such a situation when the user attempts to change lanes, rather than each time it is determined that an object is in the user's blind spot. In this situation, the computing device can detect for the presence of a turn signal, or whether the user is attempting to change lanes by the detecting the path of the automobile, before alerting the user that an object is detected in the user's blind spot.

Similarly, in accordance with various embodiments, although the computing device may determine that the user's attention is on the road, the user may not be aware that an automobile is tailgating or otherwise driving within an unsafe distance of the user's automobile. For example, as shown in FIG. 2B, automobile 220 is tailgating the user's automobile 204. In this instance, the computing device can determine the position of the tailgating automobile 220 relative to the user's automobile using any of the object detection techniques described herein, and the position can be compared to a safe distance threshold (e.g., 10 feet). If it is determined that the position of the automobile is below the threshold, the computing device can alert the user with a visual and/or audio notification indicating that an object in within an unsafe distance of the user's automobile.

In other situations, it may not be desirable to alert the user each time an object is located potentially too close to the user's automobile, such as in stop-and-go traffic. Accordingly, determining whether to alert the user can be based on the speed of the automobile as well as the distance to any detected object. For example, at low speeds, (e.g., speeds less than 5 mph), the computing device may decide not to alert the user when objects are determined to be within an unsafe distance of the user's automobile. In various other embodiments, alerts based on the proximity of the user's automobile to other objects can be temporality silenced, such as when the user is parking, in stop-and-go traffic, among others.

The computing device can also alert the user to potential imminent danger that satisfies a danger criterion, such as side collisions, head-on collisions, sudden lane changes from other vehicles, etc. For example, as shown in FIG. 2B, automobile 224 is pulling out into the intersection which can result in a head-on or side collision. The computing device can detect automobile 224, and alert the user to such a situation. Additionally, as described, the computing device can control the user's automobile to perform an evasive action, such as by stopping the user's automobile or driving around automobile 224.

Figure 3:
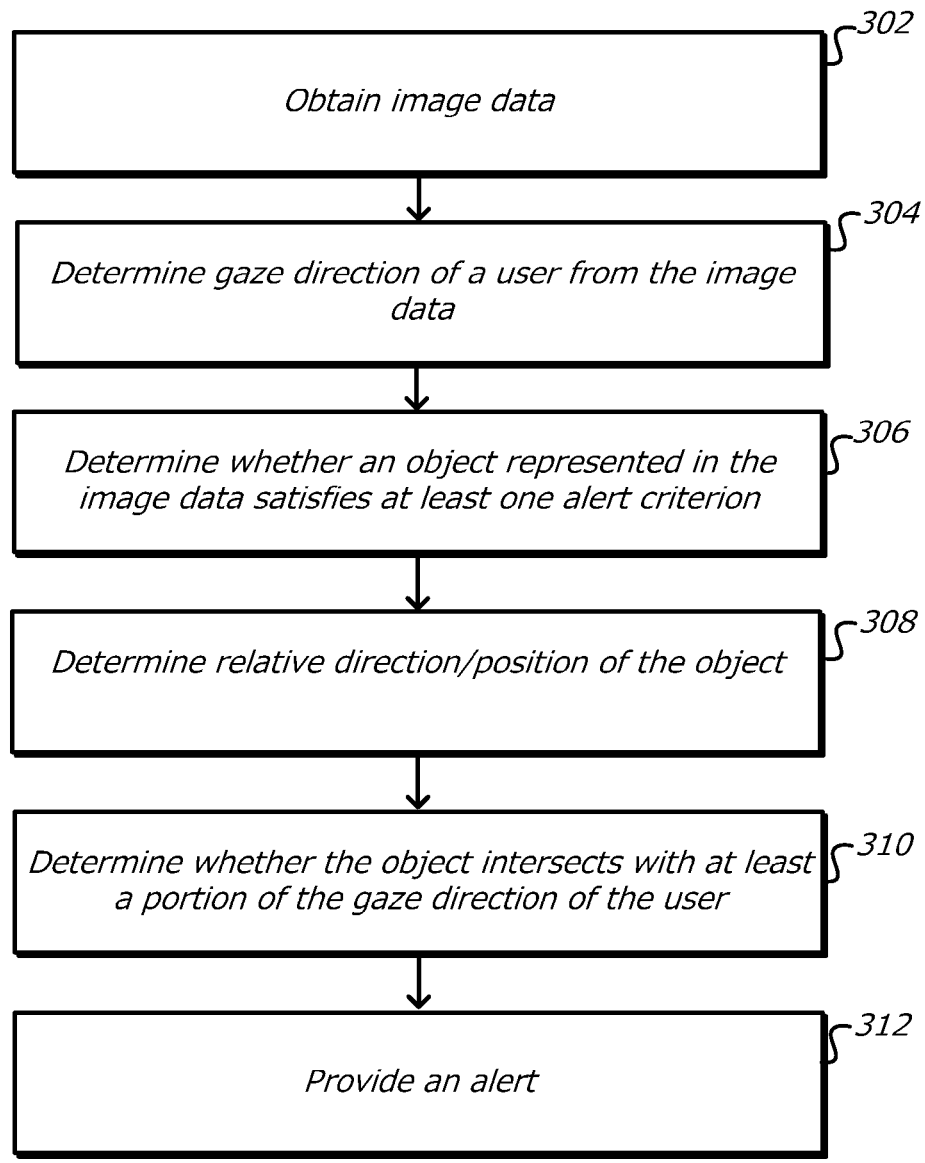
FIG. 3 illustrates an example process for providing visual and/or audible notifications to alert a driver to potential dangers, in accordance with various embodiments.

FIG. 3 illustrates an example process for providing visual and/or audible notifications to alert a driver to potential dangers, in accordance with various embodiments. It should be understood that, for any process described herein, that there can be additional or fewer steps performed in similar or alternative orders, or in parallel, within the scope of the various embodiments unless otherwise stated. In step 302, image data is captured. For example, a portable computing device can be positioned on the dashboard of the automobile in such a manner that a first camera on a first side of a computing device (e.g., a rear facing camera) can obtain image data including a representation of at least a portion of an environment outside the automobile environmental, and a second camera on a second side of the computing device (e.g., a front facing camera) can obtain image data of objects to the rear of the automobile, along with image data of the inside of the automobile such as at least a portion of a face of a user or other orientation information of the user.

In step 304, a gaze direction of a user is determined from the image data. As discussed, this can be determined in at least some embodiments by capturing image information (e.g., still or video using ambient or IR light) including the user's eyes, and analyzing the position of the eyes in the image information to determine a direction the user is looking, glancing, or gazing, each of which can depend upon the amount of time the user spends looking at a particular object, such as that captured in step 302. As discussed, in other embodiments, orientation information, such as head position and/or orientation can be used to attempt to determine where the user is looking, either alone or in combination with gaze tracking. In step 306, an object represented in the second image that satisfies at least one alert criterion or notification criterion is determined. Examples of objects satisfying at least one alert criterion or otherwise determining a characteristic of at least one object in the environment with respect to the automobile can include detecting at least one of a vehicle stopping in a driving path of the automobile, a vehicle moving towards the automobile, flashing brake or warning lights of a vehicle, flashing turn signal of a vehicle, a vehicle crossing in the driving path of the automobile, among others. As described, in some embodiments, it can be determined that an object satisfies a danger criterion, such as in the case of determining a side or head-on collision with an object. In this case, regardless of the user's gaze and/or attentiveness, a notification is provided to the user.

In step 308, the relative direction and/or location of the object is determined. In step 310, based at least in part upon the determined object location and gaze direction of the user, it can be determined whether an object intersects with at least a portion of the gaze direction of the user. As discussed, this can involve vector addition or other such geometric calculations. At step 312, in response to the object not intersecting with at least a portion of the gaze direction of the user, providing an alert or notification to the user of potential dangers and hazards, such that the user can take preventative or defensive action, etc. In other embodiments, regardless of the user's gaze direction, an alert or notification is provided in response to at least one notification criterion being met, such as detecting an object in the user's blind spot.

Figure 4A:
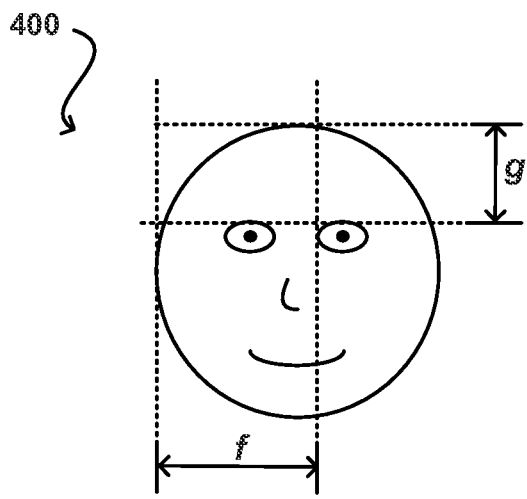
FIGS. 4A-4C illustrate examples of ways to determine gaze direction that can be utilized in accordance with various embodiments.
Figure 4A:
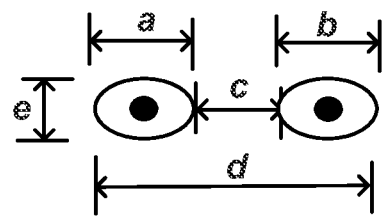
Figure 4B:
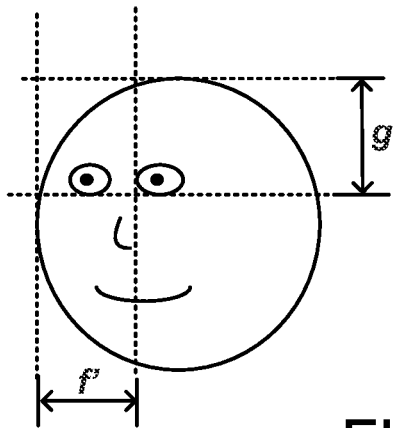
Figure 4B:
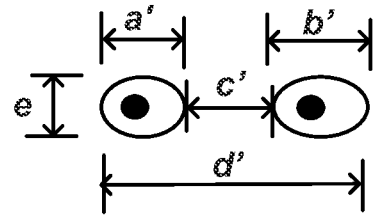
Figure 4C:
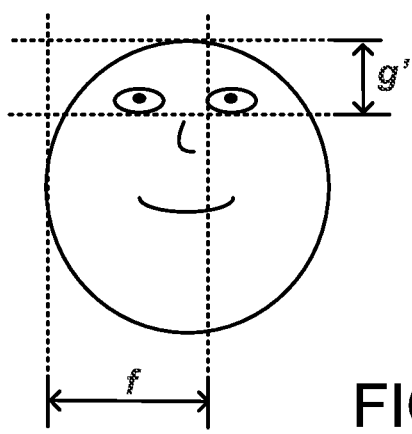
Figure 4C:
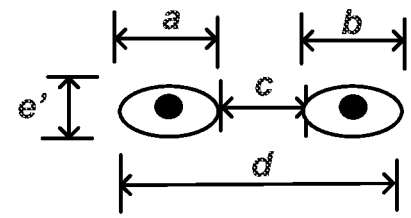

In order to determine the gaze direction of a user for such a process, a device in at least some embodiments has to determine the relative position of the user relative to the device, as well as dimensions or other aspects of the user at that position. FIG. 4A illustrates an example 400 wherein images are captured and analyzed to determine the relative positions of the user's head and the user's eyes. In a system wherein the algorithm is able to differentiate the user's pupils, the system can also utilize the relative position of the pupils with respect to the eye position. For example, FIG. 4B illustrates a case where the user is looking "left" (or to the user's right"), such that a center point of each user's pupil is to the left (in the image) of the center point of the respective eye. Similarly, FIG. 4C illustrates a case where the user is looking "up". As can be seen, the positions of the pupils have moved above a center point of the eyes. The position of the pupils can change without the user moving his or her head. Thus the system may be able to, in some embodiments, detect a glance without a change in head position. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device. A system in some embodiments can differentiate between different types of movement, such as between eye tremor, smooth tracking, and ballistic movements. In some embodiments, a user can provide specific input though various eye gestures, such as for a glance or gaze associated with a specific ballistic movement. A system could also require no ballistic movement in a continued gaze for certain input or actions, such as to enable a user to obtain additional information of the current type.

Figure 5A:
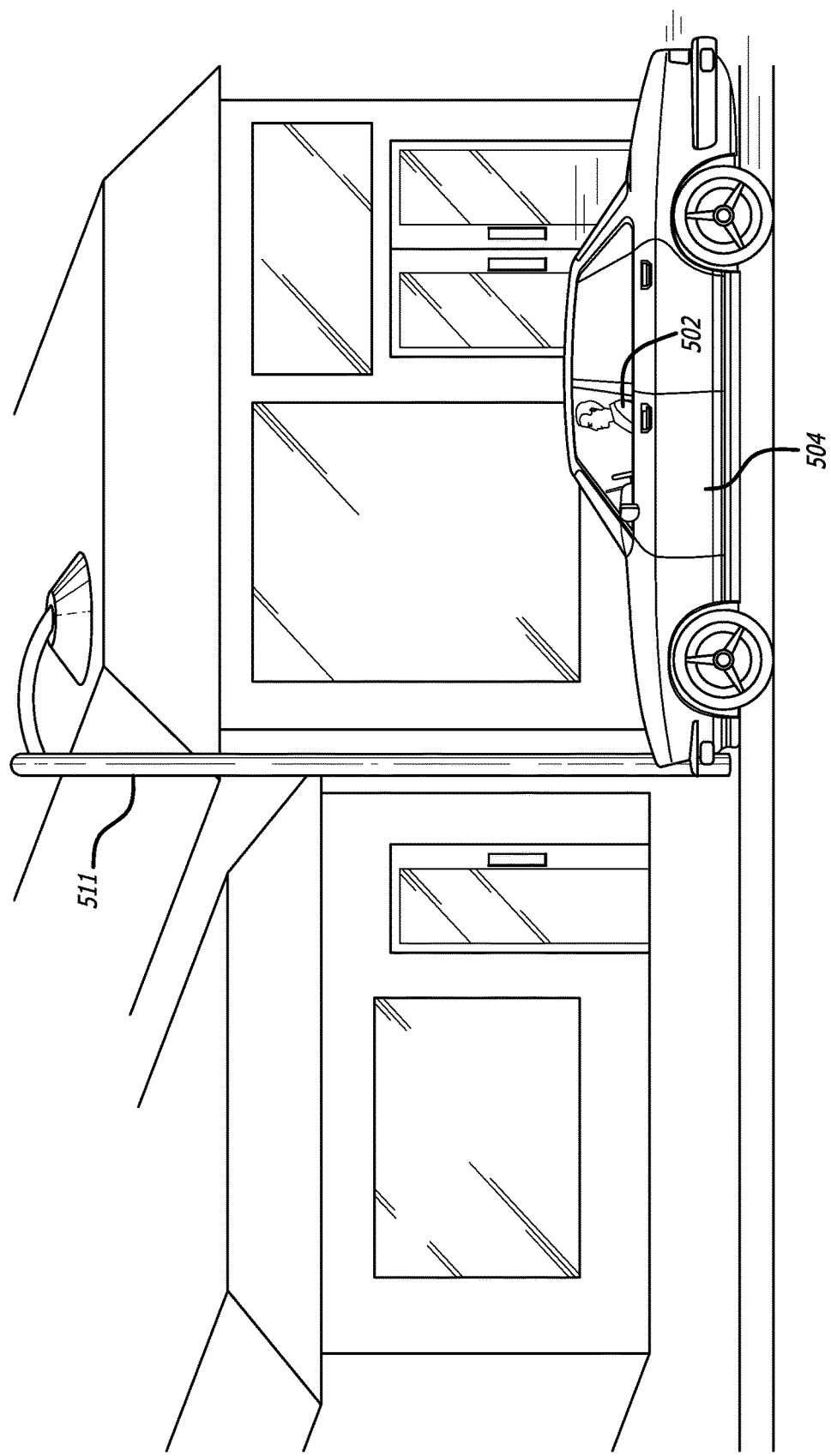
FIGS. 5A-5B illustrate an example environment in which a user can utilize an electronic device to attempt to determine the relative position of an object in accordance with various embodiments.
Figure 5B:
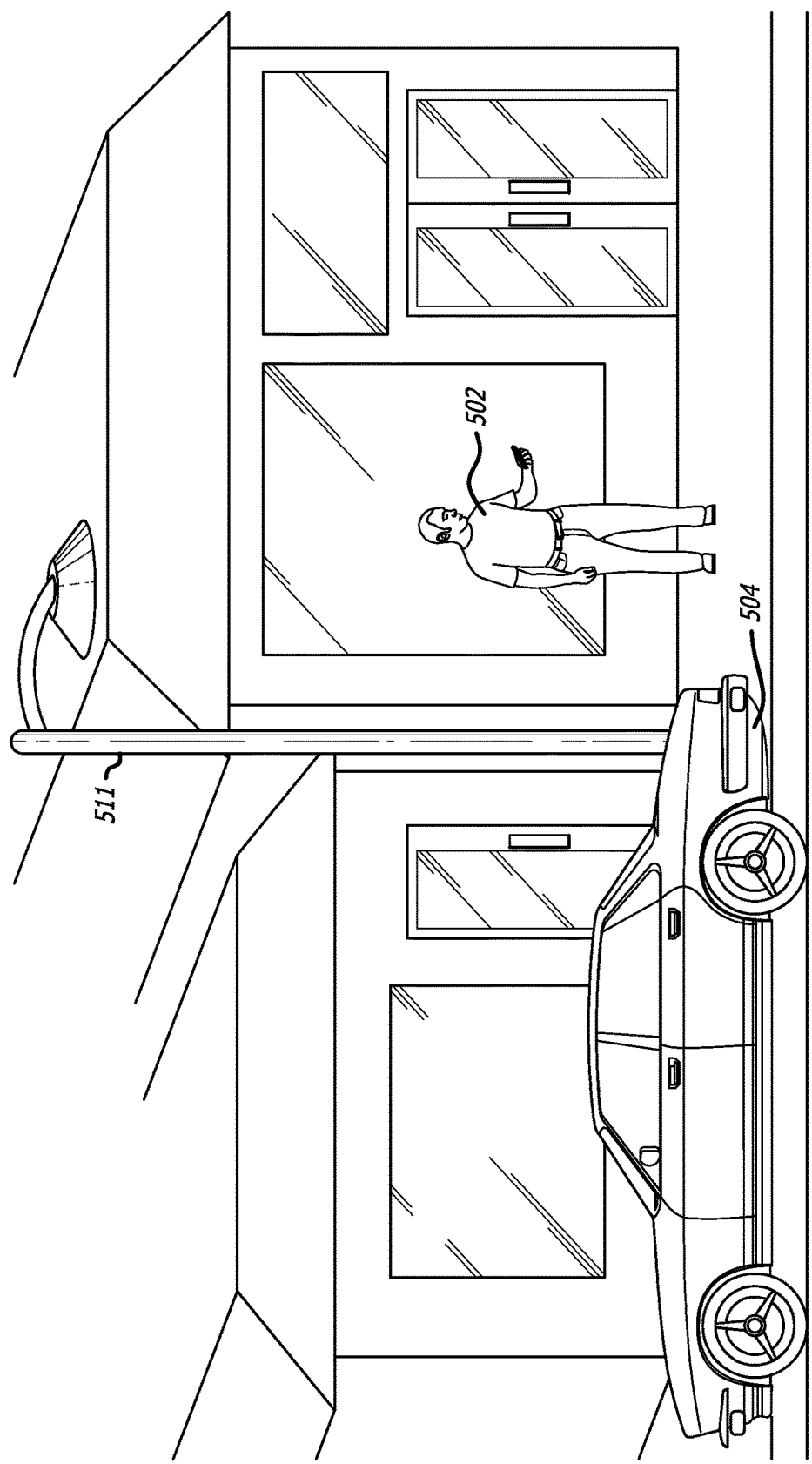

As mentioned, users of electronic devices can benefit from a driver assistance system that can determine how to locate, or get back to a particular object or location, such as the location where a user parked his or her car. For example, FIGS. 5A-5B illustrate an example situation where a user 502 has parked an automobile 504 and is moving away from the automobile. As described, in some situations, a driver may forget where they parked their automobile and may need assistance in locating their automobile. In accordance with various embodiments, the location where the user parked can be determined in a number of different ways, such as by using one or more camera of the device and/or a GPS system of the device.

FIG. 5A shows the user parking the automobile. In this situation, a portable computing device, such as the one described, is positioned on the dashboard of the automobile and the rear facing camera can obtain image (or video) data that can be used to determine whether the automobile is moving, accelerating, decelerating, or stopped.

For example, using object recognition algorithms, the device can compare the placement of an object (such as lamp post 511) in one or more image frames to determine whether the automobile is parked based at least on determined movement of the object. Determining that the object is moving faster than a determined threshold can be indicative that the device is in a moving car, and thus, the automobile is not parked. Determining that the object is moving slower (or not at all) than a determined threshold can be indicative that the device is stopped, and thus, may be parked. In accordance with an embodiment, movement relating to driving, walking, riding a bike, or engaging in another type of motion can be used to set a default threshold, and the user can adjust a sensitivity level that can be used to adjust the threshold used in determining whether the automobile is parked.

When the device determines that the automobile has stopped or is otherwise parked, the device obtains a snapshot of the GPS location of the device, or can otherwise utilize a location determination approach to determine the current location and/or coordinates, where the device marks the current coordinates, such as by storing the coordinates in a storage location that is associated with the vehicle position or other such information. Thereafter, the determined location can be used to locate and/or provide directions to the user's automobile. Various other ways of tracking and storing location and/or movement information can be used as well within the scope of the various embodiments. For example, in accordance with an embodiment, in addition to the image data, the device can use other sensors of the device to determine whether the automobile is parked. For example, electronic sensors such as accelerometers, electronic gyroscopes, electronic compasses, inertial sensors, pressure sensors, and other such elements detect movement of a device, and that movement can be tracked with respect to a fixed location in order to provide or estimate a relative position of the device, or to determine whether the car is stopped and thus potentially parked.

In accordance with various embodiments, other position determining technique, such as GPS-based determinations, can be used to determine whether the user has parked their automobile. In this situation, GPS data can be used to determine coordinates (e.g., latitude and longitude) for the marked position and these coordinates can be stored for subsequent retrieval and used to locate the parked automobile. For example, when a user wants to return to the car, the user can launch a mapping application and select an option indicating that the user would like information helping the user to locate their automobile.

In using GPS-based determinations, a rate of change of the device position or velocity data of the device, as determined by GPS data, can be used to determine the location of the user's parked automobile. As described, the user is carrying, or otherwise in possession of a portable computing device 514. The device can obtain and monitor a GPS signal to determine a rate of change of position of the device over a period of time, and the rate of change of position can be used to determine where the user parked the automobile. For example, a particular rate of change of position can indicate that the device is within the moving automobile, such as when the user is driving, and another rate of change of position can indicate that the user is walking with the device. The transition between the two rates of change of position can be indicative of where the user parked the automobile, and the GPS position of the transition can be stored and used to locate and/or provide directions to the user's parked automobile.

In accordance with an embodiment, velocity of the automobile can similarly be indicative of where the user parked the automobile. For example, using a camera of the computing device, image data that includes a representation of at least a portion of an environment outside the vehicle can be captured. The image data can be analyzed to determine a first velocity of the vehicle and a second velocity of the vehicle, where the first velocity is above a maximum walking speed and the second velocity is below the maximum walking speed. Based at least on a difference between the first velocity and the second velocity, it can be determined that the vehicle has parked. Thereafter, a location of the computing device can be determined using at least one location-determination component of the computing device based at least on the difference being observed for at least a predetermined period of time (e.g., a few minutes).

As shown in FIG. 5A, the automobile is slowing down to park, and the device will be associated with a rate of change of position indicative of a parking vehicle. In FIG. 5B, the user is walking from the car and the device will be associated with a rate of change of position indicative of a person walking. The device can determine the transition between the rate of change of position determined for when the user is driving the car and the rate of change of position determined for when the user is walking from the car. The GPS position of the transition can be stored, such as by storing the coordinates in a storage location that is associated with the vehicle position or other such information. In accordance with an embodiment, multiple locations can be stored, such as in the case where it is determined that the user may have parked. Thereafter, the location information can be used to locate and/or provide directions to the user's automobile. In the situation where more than one location was stored, the user can be presented with a history of past locations, and the user can navigate through these past locations to help assist the user in determining where they parked.

In accordance with an embodiment, in some situations, it may be difficult to determine whether the automobile is stopped, such as in stop-and-go traffic, or parked. Accordingly, the determined location/position information can be correlated with a real-world map, and when the determined location/position information indicates that the location is on a road and is moving faster than a determined threshold speed, then it can be determined that the device is in the automobile. On the other hand, if the determined location/position information maps to that of a building, other structure, or off a road such is a driveway or other parking location, then the it can be determined that the device is no longer in the automobile.

It should be noted that various embodiments can utilize other position determining techniques as well. For example, the computing device might be able to update location determinations when coming within range of one or more wireless base stations, potentially using triangulation or another such method when a sufficient arrangement is available. A device also can utilize a technology such as near-field communications (NFC) to determine when the device is near a particular location. A device can capture and/or analyze information such as audio or image information to determine a current location, such as by recognizing a sign near the device. In other embodiments, a device can attempt to communicate with other devices to come to a general consensus as to the current location.

It should be further noted that other approaches in accordance with various embodiments can take advantage of the fact that an increasing number of portable electronic devices, such as smart phones and tablet computers, are able to communicate with one or more electronic devices included in an automobile or other such object. For example, a smart phone can utilize a communications protocol such as Bluetooth® to connect to a speakerphone system of a vehicle. Similarly, a tablet computer might be able to connect to a computing system of the vehicle for purposes such as to synchronize playlists, provide Internet access, copy data to a storage device in the vehicle, and other such purposes. Each of these types of connections has a limited range, and can be automatically disconnected when the user turns off the car, or shortly thereafter. Devices and applications can be configured to detect the drop or unavailability of these connections, and use these events to trigger an automatic determination of the current position, which will generally be within a given range of the vehicle.

In the case of Bluetooth technology, for example, a Bluetooth speakerphone in a vehicle can start a discovery process when the user starts the car, whereby the speakerphone searches for nearby Bluetooth devices that can be (or are already) paired with the system. If so configured, the speakerphone can automatically connect with the user's computing device. At that point, calls or other information can be automatically routed between the speaker phone and the device. Once the device is connected, the device can go into a lower power mode, and will not wake up (at least from a connection standpoint) until a Bluetooth event happens, such as a call being received or the Bluetooth connection being dropped. When the user exits the car, turns off the car, or otherwise causes the Bluetooth system to power down, the speakerphone can disconnect from the device. The disconnection event can cause the device to wake up such that one or more actions can be taken, such as trigger an automatic determination of the current position.

Figure 6:
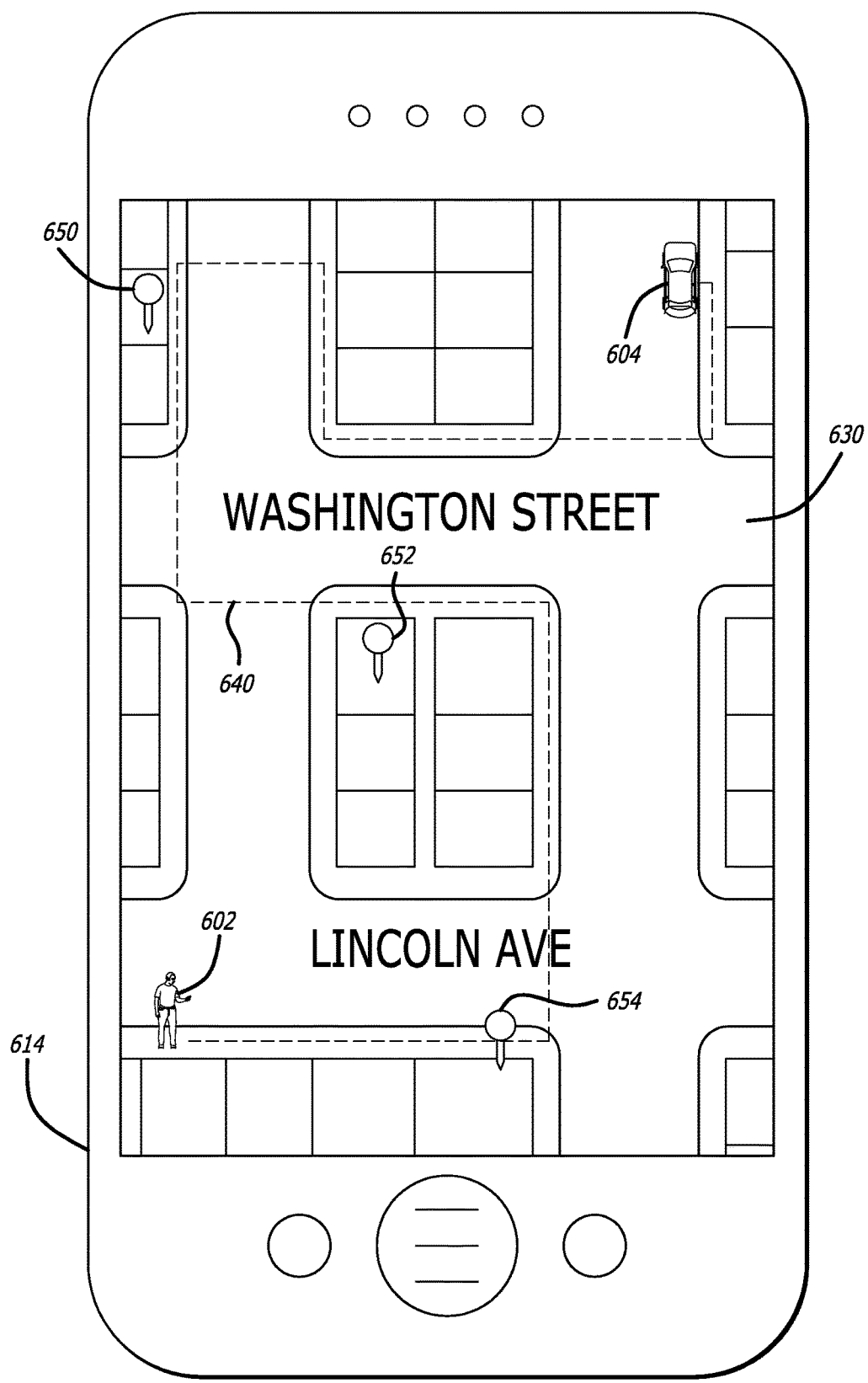
FIG. 6 illustrate an example situation where a user can obtain directions back to an object in accordance with various embodiments.

FIG. 6 illustrates a situation where a user 602 is able to obtain direction information from a portable computing device 604 based at least on the stored location information determined in FIGS. 5A-5B. As shown in FIG. 6, the user 602 has parked their automobile 604 and has walked to several locations (650, 652, 654). However, in doing so, the user has forgotten where they parked. In accordance with an embodiment, the determined location information/position data obtained in FIGS. 5A and 5B can be used to locate and/or navigate to the user's automobile.

For example, approaches in accordance with various embodiments can leverage mapping information or other such data to attempt to provide a more accurate path back to the vehicle based on the determined location of the vehicle 604 and the current determined relative location of the device 602. For example, the user is able to input to the device that the user would like directions to get back to the user's car. In response, the device can determine the direction information using the determined relative position of the car with respect to the current determined position of the device, and can display information on a display screen or other such element of the computing device. In accordance with an embodiment, the displayed information can provide turn-by-turn guidance that is updated based on the current location of the device, as known for navigation systems and other such devices. For example, as shown in FIG. 6, the user can be shown path 640, which indicates the path of the user from the automobile. Alternatively, a direct path back to the user's automobile can be displayed to the user. It should be noted that various approaches for determining a path to take between two positions are known for navigation applications, and as known the path can be optimized for aspects such as shortest distance, shortest travel time, and other such information. Similarly, one or more options can be provided to the user to determine which path to take. Approaches to generating navigation directions are well known in the art and will not be discussed in detail herein.

In accordance with various other embodiments, the displayed information can function like a compass that, instead of pointing due north, always points in the direction of the car regardless of the position and/or orientation of the device. In some embodiments, an arrow or other such graphical object can be displayed that rotates in a virtual plane to help provide directions back to the user's car. In embodiments where location information is available in three dimensions, the displayed arrow might appear to move in three dimensions, directing the user to go up or down, in addition to which direction to walk, etc. In any situation, the stored location/position information can be used to locate and/or provide directions to the user's automobile.

Figure 7:
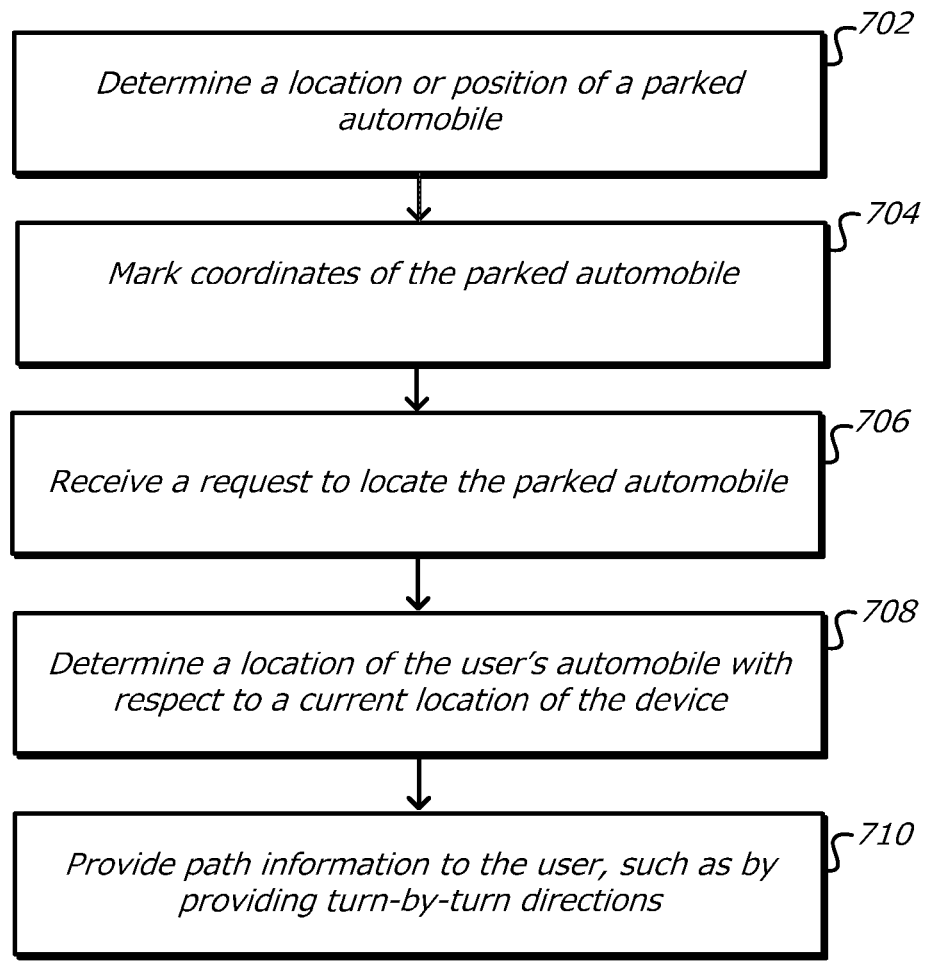
FIG. 7 illustrates an example process for determining relative location to a specific location or stationary object, and providing instructions back to that location from a current position, that can be used in accordance with various embodiments.

FIG. 7 illustrates an example process for determining relative location to a specific location or stationary object, and providing instructions back to that location from a current position, that can be used in accordance with various embodiments. In this example, a location or position of where the user parked can be determined 702 by a portable computing device. As discussed, the location can be determined in a number of different ways, such as by using one or more camera of the device and/or a GPS system of the device. For example, using at least one camera of the device to determine the location or position information can include obtaining one or more images, the images including an object, and using object recognition algorithms to determine movement of the object in the one or more images. Based on the movement, it can be determined whether the automobile is parked. Also described herein, GPS-based determinations of location information can be used. In this instance, the device can obtain and monitor a GPS signal to determine a rate of change of position of the device over a period of time, and the rate of change of position can be used to determine where the user parked the automobile. For example, a particular rate of change of position can indicate that the device is within the moving automobile, such as when the user is driving, and another rate of change of position can indicate that the user is walking with the device. The transition between the two rates of change of position can be indicative of where the user parked the automobile, and the GPS position of the transition can be stored and used to locate and/or provide directions to the user's parked automobile.

In any situation, when the device determines 704 that the automobile has stopped or is otherwise parked, the device obtains a snapshot of the determined location, or can otherwise utilize a location determination approach to determine the current location and/or coordinates, where the device marks the current coordinates, such as by storing the coordinates in a storage location that is associated with the vehicle position or other such information. Thereafter, the location information can be used to locate and/or provide directions to the user's automobile. For example, the computing device receives a request 706 from the user of the device to locate the user's car. Based at least in part upon determined location discussed herein, the computing device can determine 708 a relative location of the user's car with respect to a current location of the device. Although in many situations the analysis will be performed by the computing device, in other embodiments the position information might be obtained by a separate system or service that is operable to determine the relative location and/or directions, and provide that information to the computing device. If the computing device has access to map data for the current location, the computing device can determine and provide 710 (e.g., display) path information to the user, such as by providing turn-by-turn directions based on the current location.

Figure 8:
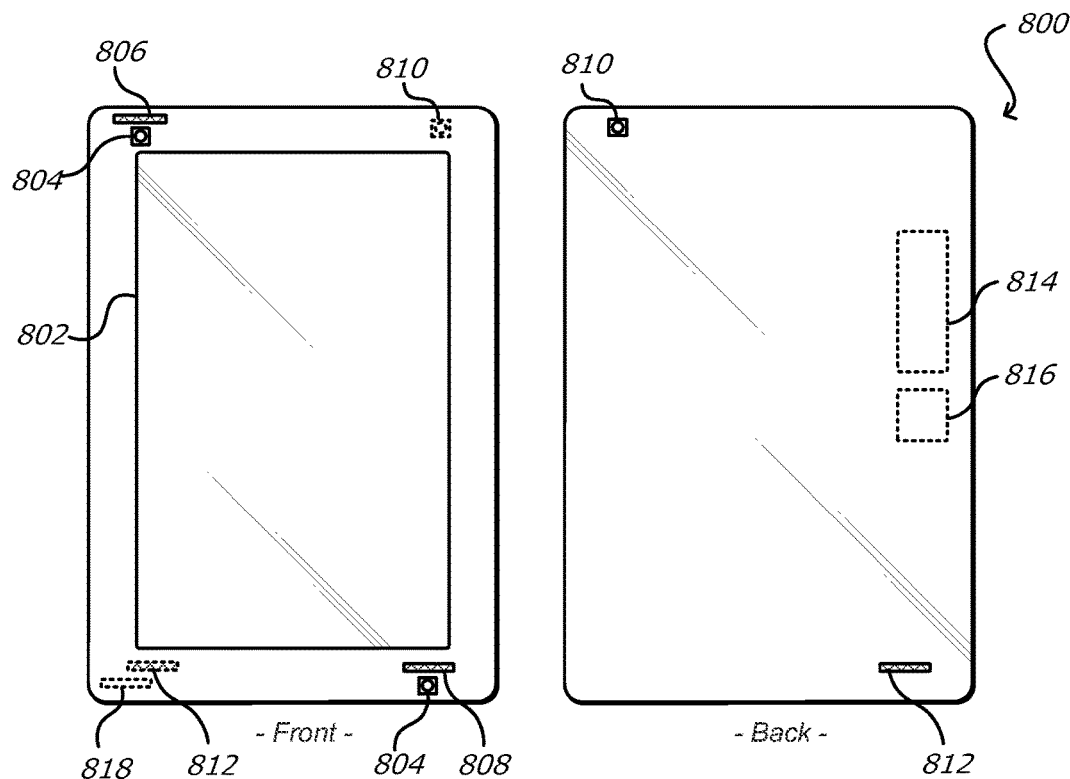
FIG. 8 illustrates front and back views of an example portable computing device that can be used in accordance with various embodiments.

FIG. 8 illustrates front and back views of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
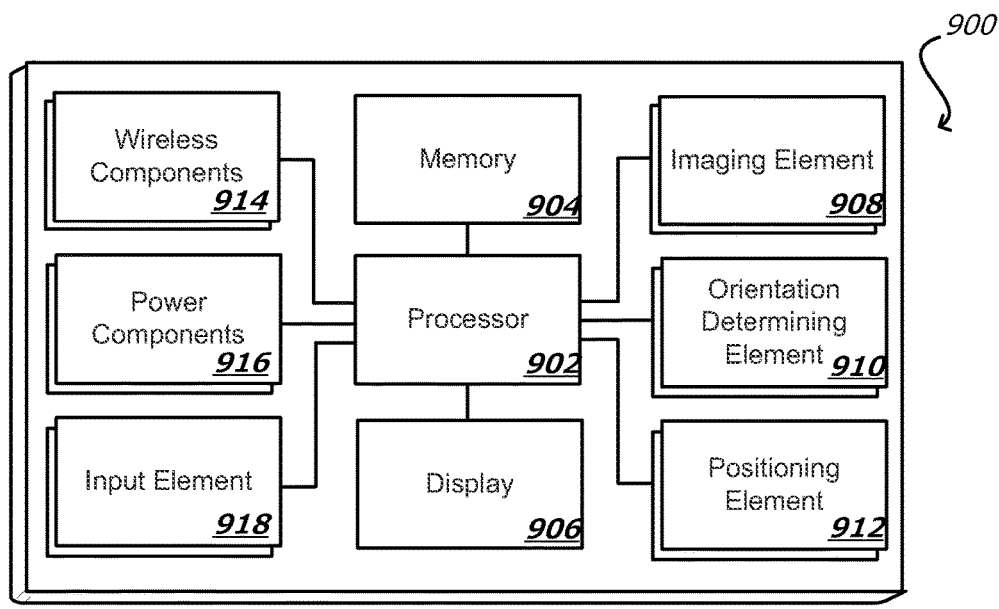
FIG. 9 illustrates an example set of basic components of a portable computing device, such as the device described with respect to FIG. 8.

FIG. 9 illustrates a set of basic components of an electronic computing device 800 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g., a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
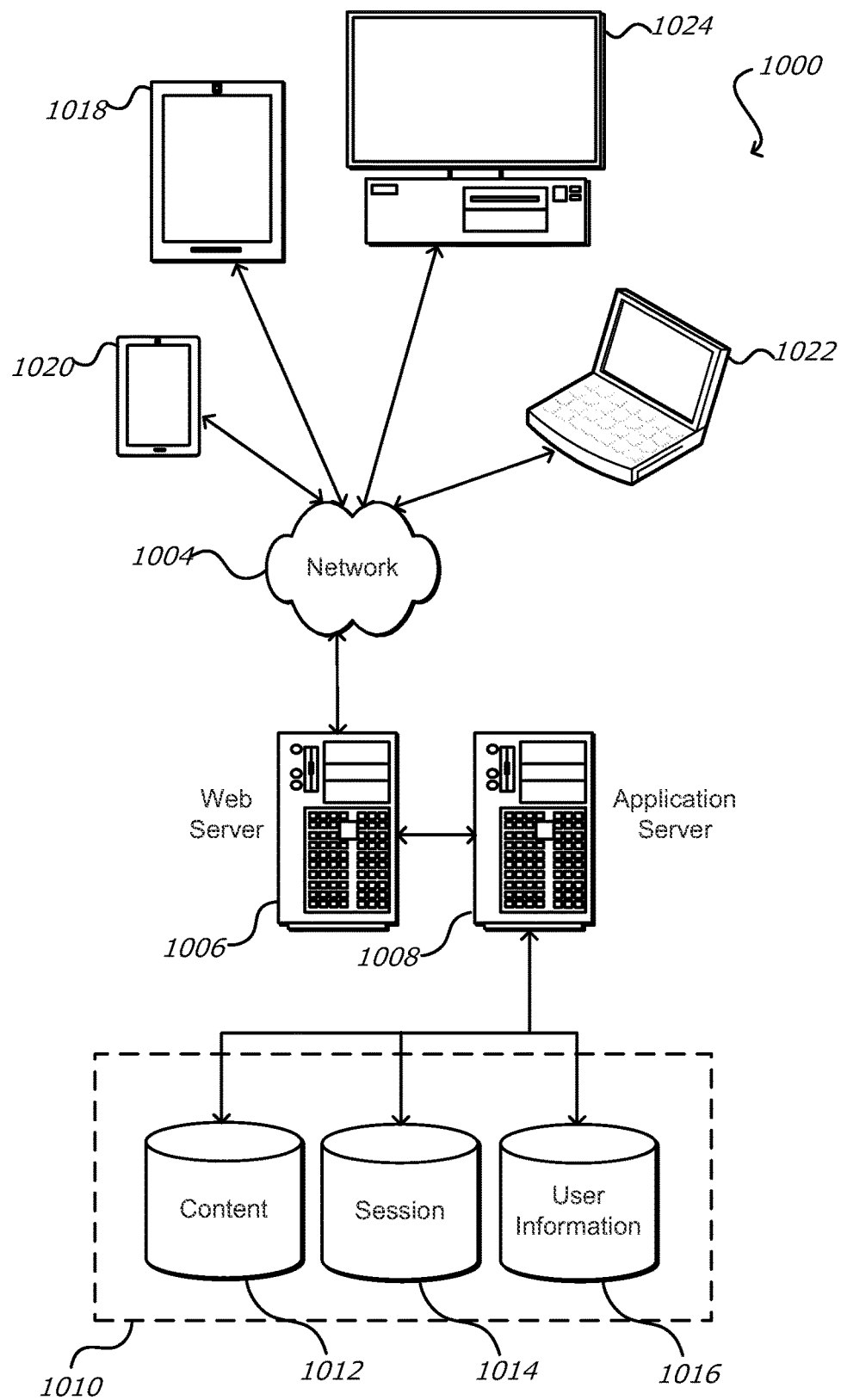
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes electronic client devices 1018, 1020, 1022, and 1024, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client devices 1018, 1020, 1022, and 1024 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 1018, 1020, 1022 and 1024. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for providing operator assistance, the method comprising:
   capturing, using a first camera on a first side of a computing device, a first image including at least a portion of a face of a user, the computing device positioned proximate to a dashboard of a first vehicle;
   capturing, using a second camera on a second side of the computing device, a second image including at least a portion of an environment outside the first vehicle;
   determining, using at least one processor of the computing device and based at least in part on the first image, a gaze direction of the user;
   based at least in part on analysis of the second image, determining a presence of an object or event in the at least a portion of the environment that presents potential harm in relation to the first vehicle;
   determining that the object or event satisfies a threshold condition sufficient to trigger an audio and vibration alarm to alert the user of the potential harm, wherein the threshold condition includes flashing brake or warning lights of a second vehicle located within a threshold distance of a driving path of the first vehicle;
   determining, using the at least one processor of the computing device and based at least in part on the gaze direction, that the gaze direction of the user is substantially away from the object or event in the environment; and
   providing the audio and vibration alarm to alert the user and providing steering instructions to guide the first vehicle around the potential harm in response to determining the object or event satisfies the threshold condition and the gaze direction being substantially away from the object or event in the environment.

2. The computer implemented method of claim 1, further comprising:
   determining that the object or event satisfies a danger criterion; and
   providing a notification when the gaze direction is substantially towards the object.

3. The computer implemented method of claim 1, wherein satisfying the threshold condition further includes detecting at least one of the second vehicle stopping within a threshold distance of the driving path of the first vehicle, the second vehicle moving in a direction towards the first vehicle, flashing a turn signal of the second vehicle located within a threshold distance of the driving path of the first vehicle, or the second vehicle moving within a threshold distance of the driving path of the first vehicle.

4. A computer implemented method, comprising:
determining an orientation of a user based at least in part on sensor information obtained from a mobile computing device, the mobile computing device positioned proximate to the user and within an interior of a first vehicle;
determining, by the mobile computing device, at least one characteristic of at least one object or event in an environment with respect to the first vehicle based at least on the sensor information, wherein the at least one characteristic includes flashing brake or warning lights of a second vehicle located within a threshold distance of a driving path of the first vehicle;
determining, based on the orientation of the user, that a gaze direction of the user is substantially away from the at least one object or event;
determining, based at least on the gaze direction of the user and the at least one characteristic, that a notification criterion is met; and
providing an audio and vibration notification within the interior of the first vehicle and providing steering instructions to guide the first vehicle around the second vehicle in response to the notification criterion being met.

5. The computer implemented method of claim 4, further comprising:
capturing, using a first camera on a first side of the mobile computing device, a first image including at least a portion of a face of the user;
capturing, using a second camera on a second side of the mobile computing device, a second image including at least a portion of the environment outside the first vehicle;
determining, based at least in part on the first image, the gaze direction of the user; and
determining an object or event represented in the second image, the object or event being associated with the at least one characteristic.

6. The computer implemented method of claim 4, further comprising:
capturing, using a first camera on a first side of the mobile computing device, a set of images including a view of at least a portion of a face of the user;
determining, based at least in part on the set of images, a blinking frequency of the user;
determining, based at least in part on comparing the blinking frequency to at least one blinking frequency threshold, that the user is likely falling asleep; and
providing the audio notification based at least in part on the blinking frequency being below the at least one blinking frequency threshold.

7. The computer implemented method of claim 4, further comprising:
capturing, using a camera of the mobile computing device, image data that includes at least a portion of an environment outside the first vehicle;
analyzing the image data to determine an amount of motion of the environment with respect to the first vehicle;
determining that the first vehicle has parked based at least in part on the determined amount of motion;
determining a location of the mobile computing device using at least one location-determination component of the mobile computing device, the location corresponding to a parked location of the first vehicle; and
in response to a request from the user of the mobile computing device to obtain directions to the parked location of the first vehicle, providing the user with directions from a current location of the mobile computing device to the parked location of the first vehicle.

8. The computer implemented method of claim 4, further comprising:
monitoring a rate of change of position of the mobile computing device over a period of time;
determining a transition from a first rate of change of position to a second rate of change of position for the period of time, the first rate of change of position above a maximum walking speed and the second rate of change of position below the maximum walking speed;
determining a location of the mobile computing device using at least one location-determination component of the mobile computing device based at least in part on the transition, the location corresponding to a parked location of the first vehicle; and
storing the location in a non-transitory computer readable storage medium of the mobile computing device.

9. The computer implemented method of claim 8, further comprising:
receiving a request from the user of the mobile computing device to obtain directions to the parked location of the first vehicle;
retrieving the location from the non-transitory computer readable storage medium; and
providing the user with directions from a current location of the mobile computing device to the parked location of the first vehicle.

10. The computer implemented method of claim 4, further comprising, providing a visual alert, an audiovisual alert, or a tactile alert.

11. The computer implemented method of claim 4, wherein determining the orientation of the user further includes determining at least one of a blinking frequency of the user, a head location of the user, or a body position of the user relative to the mobile computing device.

12. The computer implemented method of claim 4, wherein determining at least one characteristic further includes detecting at least one of the second vehicle stopping within a threshold distance of a driving path of the first vehicle, the second vehicle moving in a direction towards the first vehicle, flashing a turn signal of the second vehicle located within a threshold distance of the driving path of the first vehicle, or the second vehicle moving within a threshold distance of the driving path of the first vehicle.

13. The computer implemented method of claim 4, wherein determining the gaze direction of the user includes:
capturing video data using at least one camera, the video data including at least a portion of the face of the user;
locating position information for the user's eyes in the video data; and
determining the gaze direction based at least in part on the position information for the user's eyes.

14. A computing system, comprising:
at least one processor;
at least one camera; and
memory including instructions that, when executed by the processor, cause the computing system to:
determine an orientation of a user based at least in part on sensor information obtained from a mobile computing device, the mobile computing device positioned proximate to the user and within an interior of a first vehicle;
determine, by the mobile computing device, at least one characteristic of at least one object or event in an environment with respect to the first vehicle based at least in part on the sensor information, wherein the at least one characteristic includes flashing brake or warning lights of a second vehicle located within a threshold distance of a driving path of the first vehicle;
determine, based on the orientation of the user, that a gaze direction of the user is substantially away from the at least one object or event;
determine, based at least in part on the gaze direction of the user and the at least one characteristic, that a notification criterion is met; and
provide an audio and vibration notification within the interior of the first vehicle and provide steering instructions to guide the first vehicle around the second vehicle in response to the notification criterion being met.

15. The computing system of claim 14, wherein the instructions, when executed, further cause the computing system to:
capture, using a first camera on a first side of the computing system, a first image including at least a portion of a face of the user;
capture, using a second camera on a second side of the computing system, a second image including at least a portion of an environment outside the first vehicle;
determine, based at least in part on the first image, a gaze direction of the user; and
determine an object or event represented in the second image, the object or event being associated with the at least one characteristic.

16. The computing system of claim 14, wherein the instructions, when executed, further cause the computing system to:
capture, using a first camera on a first side of the computing system, a set of images including a view of at least a portion of a face of the user;
determine, based at least in part on the set of images, a blinking frequency of the user;
determine, based at least in part on comparing the blinking frequency to at least one blinking frequency threshold, that the user is likely falling asleep; and
provide the audio notification based at least in part on the blinking frequency being below the at least one blinking frequency threshold.

17. The computing system of claim 14, wherein the instructions, when executed, further cause the computing system to:
capture, using a camera of the mobile computing device, image data that includes at least a portion of an environment outside the first vehicle;
analyze the image data to determine an amount of motion of the environment with respect to the first vehicle;
determine that the first vehicle has parked based at least in part on the determined amount of motion;
determine a location of the mobile computing device using at least one location-determination component of the mobile computing device, the location corresponding to a parked location of the first vehicle; and
in response to a request from the user of the mobile computing device to obtain directions to the parked location of the first vehicle, provide the user with directions from a current location of the mobile computing device to the parked location of the first vehicle.

18. The computing system of claim 14, wherein the instructions, when executed, further cause the computing system to:
monitor a rate of change of position of the computing system over a period of time;
determine a transition from a first rate of change of position to a second rate of change of position for the period of time, the first rate of change of position above a maximum walking speed and the second rate of change of position below the maximum walking speed;
determine a location of the computing system using at least one location-determination component of the computing system based at least in part on the transition, the location corresponding to a parked location of the first vehicle; and
store the location in a non-transitory computer readable storage medium of the computing system.

19. The computing system of claim 14, wherein a location of the object or event and the gaze direction of the user are based at least in part on a relative orientation of the computing system to the user and the object or event.

20. A non-transitory computer readable storage medium storing one or more sequences of instructions executable by one or more processors to perform a set of operations comprising:
determining an orientation of a user based at least in part on sensor information obtained from a mobile computing device, the mobile computing device positioned proximate to the user and within an interior of a first vehicle;
determining, by the mobile computing device, at least one characteristic of at least one object or event in an environment with respect to the first vehicle based at least on the sensor information, wherein the at least one characteristic includes flashing brake or warning lights of a second vehicle located within a threshold distance of a driving path of the first vehicle;
determining, based on the orientation of the user, that a gaze direction of the user is substantially away from the at least one object or event;
determining, based at least on the gaze direction of the user and the at least one characteristic, that a notification criterion is met; and
providing an audio and vibration notification within the interior of the first vehicle and providing steering instructions to guide the first vehicle around the second vehicle in response to the notification criterion being met.

21. The non-transitory computer readable storage medium of claim 20, further comprising instructions executed by the one or more processors to perform the operations of:
capturing, using a first camera on a first side of the mobile computing device, a first image including at least a portion of a face of the user;
capturing, using a second camera on a second side of the mobile computing device, a second image including at least a portion of an environment outside the first vehicle;

determining, based at least in part on the first image, the gaze direction of the user; and determining an object or event represented in the second image, the object or event being associated with the at least one characteristic.

22. The non-transitory computer readable storage medium of claim 20, monitoring a rate of change of position of the mobile computing device over a period of time;

determining a transition from a first rate of change of position to a second rate of change of position for the period of time, the first rate of change of position above a maximum walking speed and the second rate of change of position below the maximum walking speed;

determining a location of the mobile computing device using at least one location-determination component of the mobile computing device based at least in part on the transition, the location corresponding to a parked location of the first vehicle; and storing the location in a non-transitory computer readable storage medium of the mobile computing device.

23. The non-transitory computer readable storage medium of claim 20, further comprising instructions executed by the one or more processors to perform the operations of:

capturing, using a camera of the mobile computing device, image data that includes a representation of at least a portion of an environment outside the first vehicle;

analyzing the image data to determine a first velocity of the first vehicle and a second velocity of the first vehicle;

determining that the first vehicle has parked based at least in part on a difference between the first velocity and the second velocity, the first velocity being above a maximum walking speed and the second velocity being below the maximum walking speed; and determining a location of the mobile computing device using at least one location-determination component of the mobile computing device based at least in part on the difference being observed for at least a predetermined period of time.

24. The non-transitory computer readable storage medium of claim 20, wherein determining the gaze direction of the user includes estimating the gaze direction based at least in part on a direction of a head of the user.

\* \* \* \* \*